United States Patent

[11] 3,629,520

[72] Inventor Leonard J. Schwee
Silver Spring, Md.
[21] Appl. No. 884,103
[22] Filed Dec. 11, 1969
[45] Patented Dec. 21, 1971
[73] Assignee The United States of America as represented by the Secretary of the Navy

[54] READOUT AND RECORDING METHOD AND APPARATUS
7 Claims, 9 Drawing Figs.

[52] U.S. Cl. 179/100.2CF, 340/174 TF
[51] Int. Cl. G11b 5/02, G11c 11/14
[50] Field of Search 340/174 TF, 174 TL, 174.1; 179/100.2 GF, 100.2 CH

[56] References Cited

UNITED STATES PATENTS 3,354,447 11/1967 Oshima 340/174.1

*Primary Examiner*—Terrell W. Fears
*Assistant Examiner*—Robert S. Tupper
*Attorneys*—R. S. Sciascia and J. A. Cooke

ABSTRACT: A method and apparatus for nondestructive readout of magnetic images stored on magnetic thin films and for recording magnetic inputs on thin films. A uniaxially anisotropic thin film of magnetic material carrying a recorded magnetic image is transported over a transmission line in the presence of a magnetic tickling field. A radiofrequency oscillator is coupled to the transmission line and the tickling field is made to oscillate at a relatively low frequency. The magnetic image recorded on the passing thin film is then read out by detecting the modulation of the radiofrequency signal caused by ferromagnetic resonance absorption. The same apparatus is used for recording by replacing the radiofrequency oscillator with a direct current source and by modulating the tickling field with the signal to be recorded.

INVENTOR
Leonard J. Schwee

BY

ATTORNEY

INVENTOR
Leonard J. Schwee

READOUT AND RECORDING METHOD AND APPARATUS

BACKGROUND OF THE INVENTION

This invention relates generally to the art of magnetic signal readout and recording, and, in particular, to a method and apparatus for reading out information stored on magnetic thin films and also for recording signals on thin films.

Recent developments in the art of recording magnetic images on thin films have created a need for a completely new type of highly sensitive readout device. An example of one such development may be found in copending application Ser. No. 2,757, filed Jan. 14, 1970, Navy Case No. 47,469 of Henry R. Irons and Leonard J. Schwee entitled "Method and Apparatus for Recording Transient Signals of Short Duration" and of the same assignee as the instant application.

Magnetic images recorded on thin films are detectable only by sensing of the magnetic fields they produce. Since recording films may be on the order of only 100 angstrom units thick, the fields produced by such images are created by the alignment of a relatively small number of atomic magnetic moments in the film. As a result, the fields are extremely minute, and the magnetic images difficult to detect.

One method of detection, described in the above-noted copending application, involves the observation of Bitter patterns. According to this method, a soap solution containing a suspension of fine iron oxide particles is applied directly to the surface of the recording film. The iron oxide particles gradually migrate to the domain boundaries along the profile of the recorded signal, producing a visually observable outline of the signal when the soap solution evaporates. This somewhat crude technique possesses disadvantages in that a substantial period of time is required before the patterns are observable and it results in the physical destruction of the recording film.

Presently available magnetic transducers, which theoretically permit recorded information to be read out without damaging the film, have been found to be either insufficiently sensitive to accurately detect the magnetic fields created by the recorded images, or exceedingly expensive and delicate and thus impractical for use in many field environments.

In seeking to develop an improved readout device, it was discovered that the same apparatus which can overcome the enumerated deficiencies in the prior art readout techniques also can be used with minor modifications to record signals. As a recorder, the apparatus permits very slow and accurate movement of the recording film, which makes the device particularly adaptable to the recording of very slowly changing phenomena, such as the decay of radio active materials with long half lives, relative movements of the continents, and changes in the depth of the sea due to melting of the polar ice caps. Prior art devices are somewhat unsuitable for recording such signals due to their occasionally unreliable and inaccurate operation at very low recording speeds.

SUMMARY OF THE INVENTION

Accordingly, one object of this invention is to provide a highly sensitive apparatus for detecting recorded images.

Another object of this invention is the provision of a highly sensitive apparatus for reading out magnetic records.

Yet another object of this invention is to provide an improved method of reading out recorded magnetic information.

A further object of this invention is the provision of an apparatus particularly suitable for accurately recording signals generated by slowly varying phenomena.

A still further object of this invention is the provision of an improved apparatus suitable for both recording and reading out magnetic signals.

Another still further object of this invention is the provision of an improved method of reading out magnetic records without damaging the recording medium.

Yet another object of the invention is to provide an improved readout device which is rugged, accurate, reliable and economical to produce.

Briefly, in accordance with one embodiment of this invention, these and other objects are achieved by effecting relative physical movement between a thin uniaxially anisotropic film carrying a recorded magnetic image and a conductor. To read out the magnetic image on the film, a low frequency tickling field is generated in perpendicular field coils parallelly spaced on either side of the film while a high-frequency electromagnetic wave is produced in the conductor. The recorded image on the passing thin film modulates the high-frequency wave in a characteristic manner. This modulation, once detected, serves as an accurate representation of the recorded image.

Recording is accomplished by applying a high intensity scanning field to the film by passing a unidirectional current through the conductor, while simultaneously applying the signal to be recorded to the film through the field coils.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

FIGS. 5*a*, 5*b* and 5*c* are graphical illustrations of phase and amplitude modulation through ferromagnetic resonance absorption caused by the various recorded signals shown in FIG. 4.

DESCRIPTION OF THE PREFERRED EMBODIMENT

Figure 1:
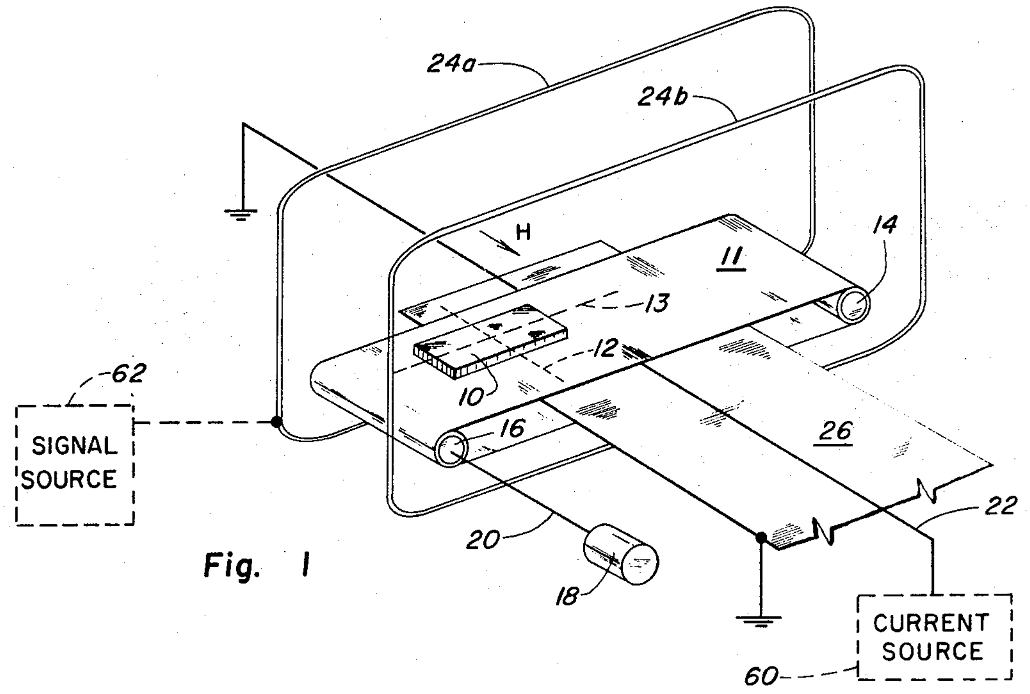
FIG. 1 is a perspective view of the readout and recording apparatus of the instant invention.

Referring now to the drawings wherein like reference characters designate identical or corresponding parts throughout the several views, and more particularly to FIG. 1 thereof, a length of thin film 10 is shown supported by a moving element 11, which may for example be a continuous conveyor belt. Film 10 preferably consists of a thin layer of a uniaxially anisotropic magnetic alloy. The alloy is preferably of an 80 percent nickel and 20 percent iron composition, although other mixture combinations are possible, provided that the film possess the properties described by E. W. Pugh in *Physics of Thin Films* Vol. 1, p. 300, Academic Press (1963). A uniaxially anisotropic film is characterized in that it possesses orthogonal easy and hard axes of magnetization, 12 and 13 respectively. The easy axis 12 is that along which the individual atomic magnetic moments of the atoms composing the film normally lie. Consequently, it is the axis along which signals are most easily recorded. The hard axis 13 is perpendicular to easy axis 12, and represents the axis along which atomic magnetic moments are the most unstable. Thus, recording along this axis is very difficult, requiring an extremely high energy input. Although the theory of recording magnetic signals on such a film will be familiar to those skilled in the art, a detailed explanation of it may be found in the previously noted copending application of Irons and Schwee.

Conveyor belt 11 is preferably constructed of a flexible nonmagnetic material, such as rubber or plastic, and is supported by an idler wheel 14 and a drive pulley 16. A constant speed motor 18 which may be a clock motor or any similar accurately timed drive is connected by a shaft 20 to drive pulley 16 to move belt 11 at a uniform rate. It will be apparent to one skilled in the art that the entire conveyor belt and drive system may be replaced by any one of a variety of equivalent mechanical systems capable of transporting an object at a constant rate.

A conductor 22 which may be a wire, is positioned perpendicular to the path film 10 must follow to scan the film as it passes by. While conductor or wire 22 is shown below the transporting surface of belt 11 and beneath film 10, it could be above belt 11 and above film 10.

A pair of field coils 24*a* and 24*b* are positioned parallel to belt 11 and on either side of the belt. Coils 24*a* and 24*b* may be replaced by any equivalent device for creating a uniform field orthogonal to hard axis 13 in the vicinity where film 10 crosses conductor or wire 22. A grounded plate of conductive nonmagnetic material 26 is placed in close proximity to wire 22, but slightly separated therefrom to serve as a plane of reference potential in order to form a transmission line in conjunction with conductor 22 for passing radiofrequency signals. While grounded plate 26 is shown passing through belt 11, it could also be positioned above or below it as desired without changing the operation of the device in any way, as long as it is placed proximate to conductor 22.

Figure 2:
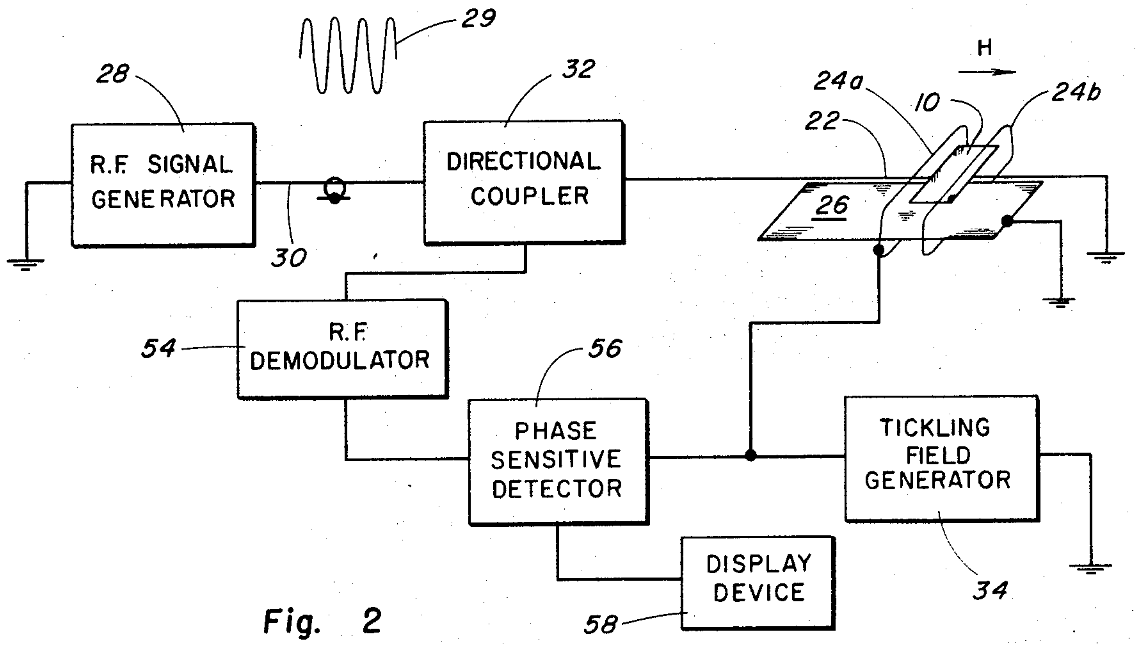
FIG. 2 is a block diagrammatic view of the electrical system used in reading out recorded magnetic images according to the method of the instant invention.
Figure 3A:
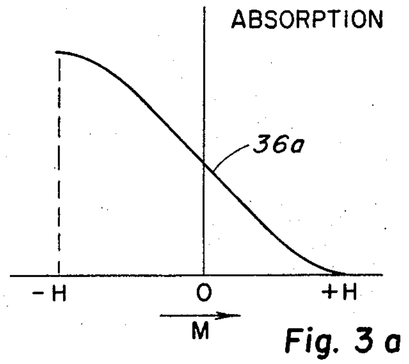
FIGS. 3*a* and 3*b* are graphical representations of ferromagnetic resonance absorption curves.
Figure 3B:
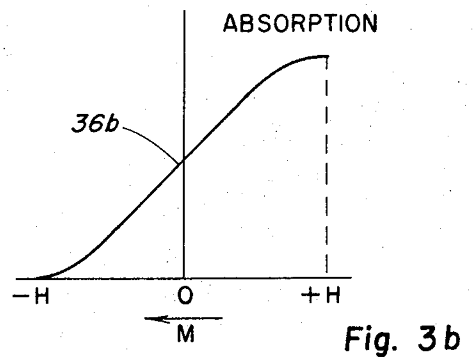

FIG. 2 shows the electrical system for carrying out the readout process as including a radiofrequency generator 28 which produces an electromagnetic output signal or wave 29 in a high-frequency range, such as from 100 MHz. to 1 GHz. Signal 29 is carried by a transmission line 30, which may be a coaxial cable if spurious radiation appears to be a problem. Transmission line 30 is connected to a directional coupler 32 which permits free signal flow away from RF generator 28, but not in the opposite direction. The output of the directional coupler is passed to the transmission line formed of conductor 22 and grounded plate 26 for carrying electromagnetic wave 29 into close proximity with film 10. In practice wave 29 is transmitted across film 10 and is then reflected from the grounded end of conductor 22 back toward directional coupler 32. It is to be noted that the grounding of conductor 22 and the reflection it causes are not necessary to practice the invention, although it tends to enhance the output signal strength. It should be apparent to those skilled in the art that conductor 22 cannot be a coaxial cable, since it is important that film 10 be directly exposed to radiation from the conductor.

In passing in close proximity to film 10, wave 29 is modulated by the magnetic image recorded on it through the process of ferromagnetic resonance absorption. In essence, ferromagnetic resonance is a property exhibited by magnetic thin films (and other magnetic materials) in which the atoms of the film are capable of absorbing energy from an oscillating electromagnetic wave. The amount of energy absorbed depends upon the amplitude of the recorded image field (i.e., the number of atomic magnetic moments aligned in a particular orientation) and upon the amplitude of a tickling field H. The phase of absorption depends upon the direction in which the atomic magnetic moments comprising the recorded image are oriented.

The tickling field is provided by coils 24*a* and 24*b*, which are driven by a generator 34. The generator develops an oscillating output signal of a frequency somewhere in the range between 100 Hz. and 100 kHz. Although the tickling field should be static to create a linear absorption characteristic, the scanning frequency range stated above is sufficiently below that of radiofrequency generator 28 so that the scanning field appears relatively static. In practice the system works well if RF generator 28 is set at 300 MHz. and tickling generator 34 is set at 20 kHz.

The process by which the magnetic image on film 10 modulates wave 29 may be better understood by reference to FIGS. 3–6. Curve 36*a* of FIG. 3*a* illustrates the variation in ferromagnetic resonance absorption as the scanning field changes from a maximum of +H to a minimum of –H. It should be understood that the plus and minus signs merely indicate the direction of the vector scanning field H. Curve 36*b* of FIG. 3B shows the same phenomenon as curve 36*a*, but is inverted in phase by 180°. This phase inversion represents the fact that ferromagnetic resonance absorption depends upon the orientation of the atomic magnetic moments, or magnetization M of film 10.

Figure 4:
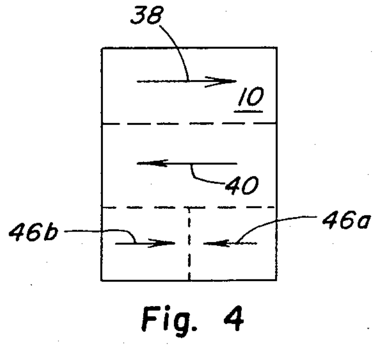
FIG. 4 is a schematic illustration of a thin film having magnetic images recorded thereon.
Figure 5A:
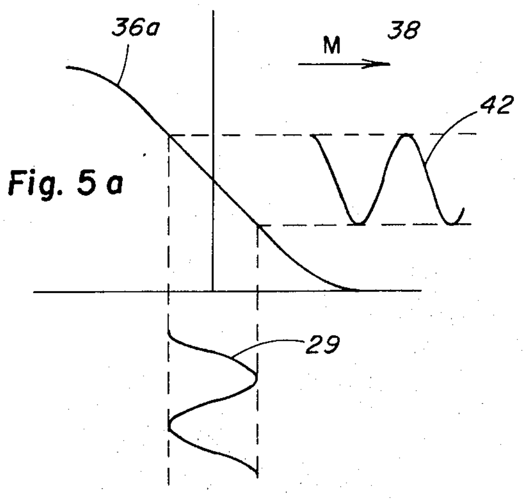
Figures 5, 6:
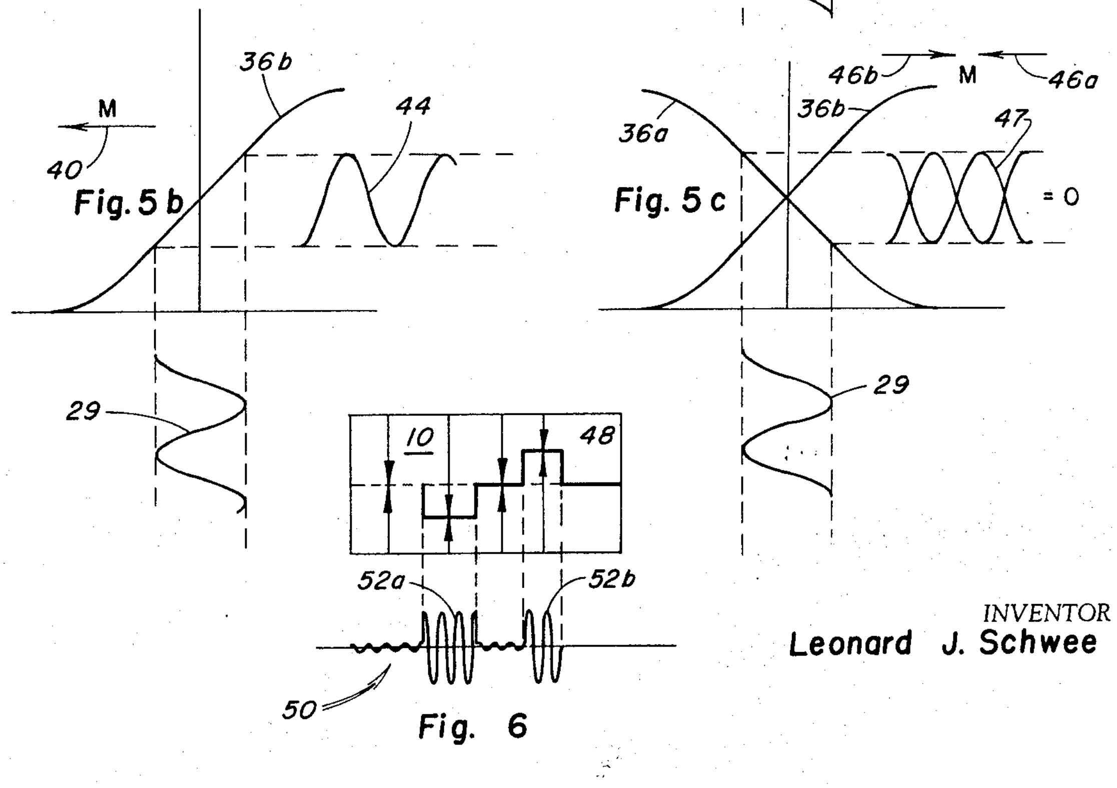
FIG. 6 is a graphical representative of modulation caused by a recorded magnetic image having a particular waveform.

The relationship between absorption curves 36*a* and 36*b* and the modulation of signal or wave 29 by the magnetic image on film 10 illustrated in FIGS. 4 and 5. The modulation of wave 29 by energy absorption of film 10 is changed in phase by changing the orientation of the magnetization M of the film. Attention is directed to the oppositely oriented magnetization vectors 38 and 40 shown in FIG. 4. In terms of film 10, these vectors represent recorded magnetic images of opposite polarity. As shown in FIGS. 5*a* and 5*b* respectively, the modulated waves 42 and 44, which are the result of transmitting wave 29 near magnetizations 38 and 40 respectively, are 180° out of phase. Thus, it should be clear that the phase of the modulation induced on wave 29 by transmission across film 10 is an indication of the polarity of the recorded magnetic image.

The amplitude of the recorded magnetic image is reflected in the amplitude of the modulation of wave 29. In terms of film 10, the amplitude of the recorded magnetic image is determined by the extent to which the recorded image has caused reorientation of the magnetization of the film 10. As is more fully explained in the previously identified copending application, the magnetization of the film is initially equal and opposite on either side of the centerline of the film. Thus amplitude variations in the recorded signal take the form of inversions of the initial orientation of the magnetization on one side or the other of the film's centerline. This leaves the magnetization oriented in one direction of greater magnitude than that oriented in the opposite direction. As explained hereinbefore, these oppositely oriented magnetizations produce modulations of wave 29 which are opposite in phase, causing a cancellation effect. Since the magnitudes of the oppositely oriented magnetizations differ, the cancellation is not complete. Instead, a signal of reduced amplitude accurately representing the magnitude of the recorded magnetic image remains.

The cancellation process can be better understood by reference to FIG. 5*c* wherein is illustrated the process by which equal and opposite magnetization (i.e., no recorded image) produces a zero output.

The condition in which no signal is recorded on film 10 is illustrated by equal and opposite magnetization vectors 46*a* and 46*b* in FIG. 4. Passing wave 29 near film 10 having such equal and opposite magnetizations produces two equal modulations which are 180° out of phase, as is illustrated by a complex wave 47. The net effect of such equal and opposite modulation is total cancellation, so that no net output is produced by film 10 in the absence of a recorded signal.

FIG. 6 illustrates a signal represented by a boundary 48 recorded on film 10. The modulation of wave 29 induced by the signal conforming to boundary 48 is shown as a modulated waveform 50. It should be noted that the modulated wave 50 possesses a pair of high amplitude pulses 52*a* and 52*b*, representing the steps in boundary 48. The oscillations within pulses 52*a* and 52*b* are 180° out of phase, representing the reversed polarity of the equivalent steps in boundary 48.

The amplitude and phase modulations described are detected by the apparatus of FIG. 2. Wave 29, which has been modulated by passage near film 10 is reflected back to directional coupler 32, which channels a portion of the modulated wave to a radiofrequency demodulator 54 to rectify and filter the radiofrequency components of wave 29 out of the modulated signal in the conventional manner. The demodulated signal is then fed to a phase-sensitive detector 56, which is coupled to tickling generator 34, and to a display device 58. The phase-sensitive detector 56 compares the phase of the modulated signal to that of tickling generator 34. If the two signals are in phase, detector 56 generates a DC voltage of one polarity, and if they are out of phase, it generates a DC voltage of the opposite polarity. The magnitudes of the DC voltages are determined by the amplitude of the modulation detected by RF demodulator 54, and are thus proportional to the magnitudes of the recorded magnetic images. The DC voltages are then fed to display device 58, which may be an X–Y plotter or any equivalent display apparatus, to reproduce the magnetic images recorded on film 10 in a visually observable manner.

As disclosed previously, the same apparatus may serve as a recorder with minor modifications. As shown in FIG. 1, a unidirectional current source 60 is connected to conductor 22, and a signal source 62 is connected to coils 24*a* and 24*b*. The unidirectional energy flowing through conductor 22 creates a high intensity magnetic field oriented parallel to hard axis 13 of film 10. This field, which is localized in the immediate vicinity of conductor 22 scans film 10 as it moves across the conductor. Signal source 62 applies an electrical signal to coils 24*a* and 24*b* to produce a recordable magnetic field parallel to easy axis 12 of film 10. Source 62 may be any one of a variety of electrical signal generators or transducers which convert physical measurements into electrical signals. The signal from source 62 is recorded on film 10 as the film passes conductor 22, since at that point the scanning and signal fields combine to overcome coercive force of the material comprising film 10. This process is more fully described in the copending application of Irons and Schwee.

A magnetic field of constant gradient may be applied to film 10 by a pair of gradient coils (not shown) mounted on either side of film 10 to insure that the recording is a linear representation of the input signal. As explained in greater detail in the noted copending application, separate gradient coils may be unnecessary depending on the nature of the thin film and on the physical configuration of the recording apparatus.

The invention arranged in its recording configuration is especially useful for recording extremely slowly varying signals since belt 11 may be accurately driven at an extremely slow rate by a conventional clock mechanism.

If no signal is applied by source 62, the device may be used to erase recorded information, although erasure is not strictly necessary, since existing signals are automatically erased by the recording of new ones.

Obviously numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. Apparatus for reading out magnetic information recorded on a uniaxially anisotropic thin film having an anisotropic axis comprising:
   signal transmission line means normally separated from said thin film and oriented parallel to said anisotropic axis, and couplable to a source of high-frequency electromagnetic waves for transmitting said high-frequency electromagnetic waves across said thin film;
   means for effecting relative movement between said thin film and said signal transmission line means, whereby the entire area of said thin film passes within close proximity to said signal transmission line means;
   means for effecting modulation of said high-frequency electromagnetic waves by said magnetic information;
   means coupled to said signal transmission line means for demodulating and for phase detecting the modulated high-frequency electromagnetic waves to produce a direct current output signal having an amplitude proportional to the amplitude of said magnetic information.

2. Apparatus as in claim 1 wherein:
   said signal transmission line means comprises a grounded conductive plate, and
   a conductor positioned adjacent said plate.

3. Apparatus as in claim 1 wherein:
   said means for effecting relative movement comprises a constant speed conveyor belt.

4. The apparatus of claim 1, further comprising:
   means coupled to said demodulating and phase detecting means for visually displaying said direct current output signal.

5. The apparatus of claim 1, wherein said means for effecting modulation comprises a plurality of field coils connectable to a source of alternating current potential for exposing said thin film to a low-frequency magnetic field oriented parallel to said anisotropic axis.

6. The apparatus of claim 5, wherein said demodulating and phase detecting means comprises:
   a radiofrequency demodulator coupled to said signal transmission line means for demodulating said high-frequency electromagnetic waves;
   a phase-sensitive detector connectable to said source of alternating current potential and coupled to the output of said radiofrequency modulator for comparing the output of said radiofrequency modulator to said alternating current potential to produce said direct current output signal.

7. A method of reading out magnetic images recorded on a uniaxially anisotropic thin film comprising the steps of:
   transmitting high-frequency electromagnetic waves through a transmission line positioned parallel to the anisotropic axis of said thin film;
   effecting relative motion between said thin film and said transmission line;
   applying a low-frequency magnetic field to said thin film to modulate said high-frequency electromagnetic waves by said magnetic images in response to the presence of low-frequency magnetic field;
   demodulating the modulated high-frequency electromagnetic waves; and
   phase detecting the demodulated high-frequency electromagnetic waves to produce a direct current output signal having an amplitude proportional to the amplitude of said magnetic images.

* * * * *